E. B. SYMONS.
CRUSHING MACHINE.
APPLICATION FILED APR. 17, 1911.

1,010,977.

Patented Dec. 5, 1911.
3 SHEETS—SHEET 3.

Witnesses.
Edward T. Wray.
Sophie B. Wender.

Inventor.
Edgar B. Symons.
by Parker & Carter
Attorneys.

UNITED STATES PATENT OFFICE.

EDGAR B. SYMONS, OF MILWAUKEE, WISCONSIN.

CRUSHING-MACHINE.

1,010,977.      Specification of Letters Patent.      Patented Dec. 5, 1911.

Application filed April 17, 1911. Serial No. 621,483.

*To all whom it may concern:*

Be it known that I, EDGAR B. SYMONS, a citizen of the United States, residing at Milwaukee, in the county of Milwaukee and State of Wisconsin, have invented a certain new and useful Improvement in Crushing-Machines, of which the following is a specification.

My invention relates to improvements in crushing machines and is illustrated diagrammatically in one form in the accompanying drawings, wherein—

Figure 1:
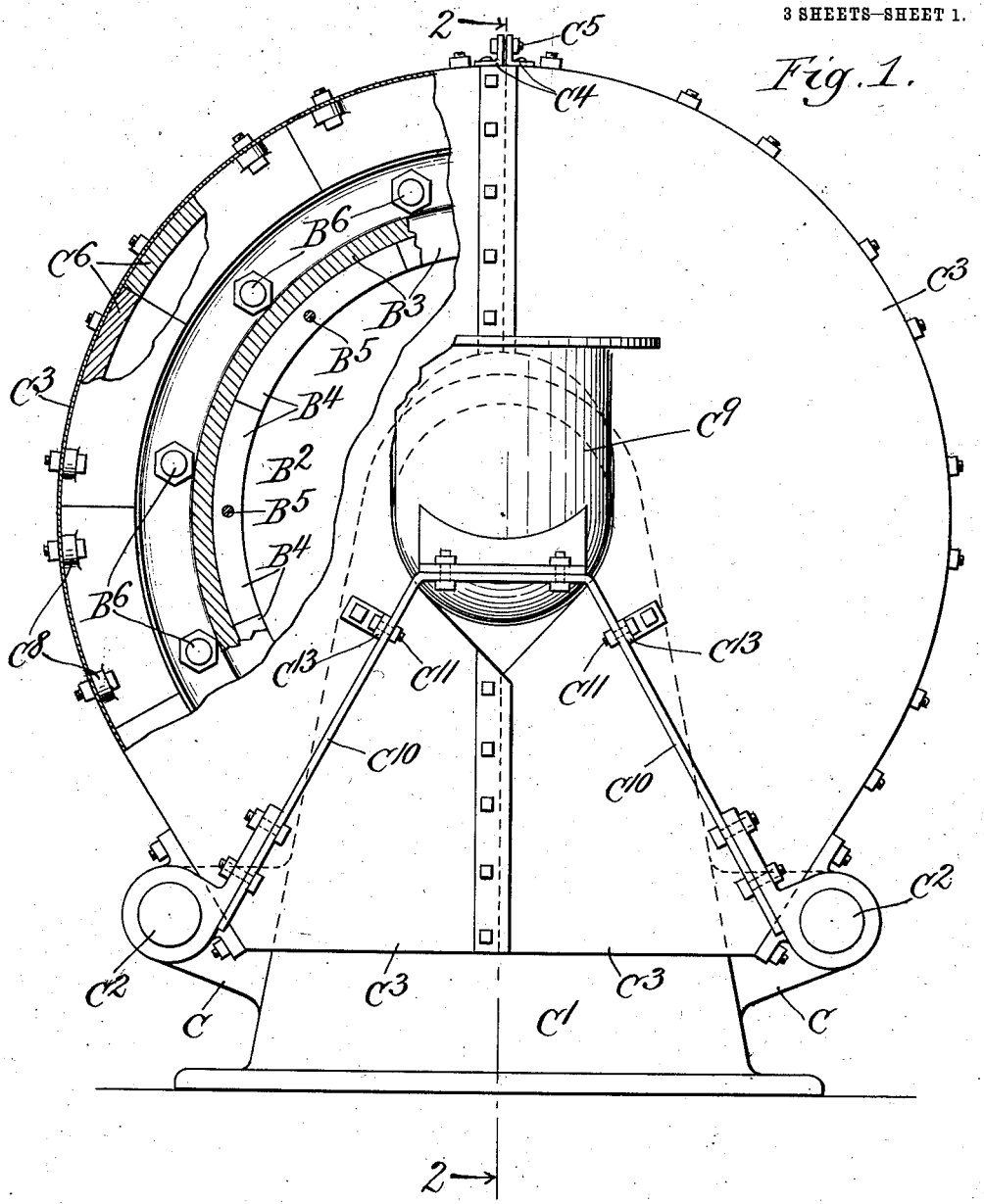
Figure 2:
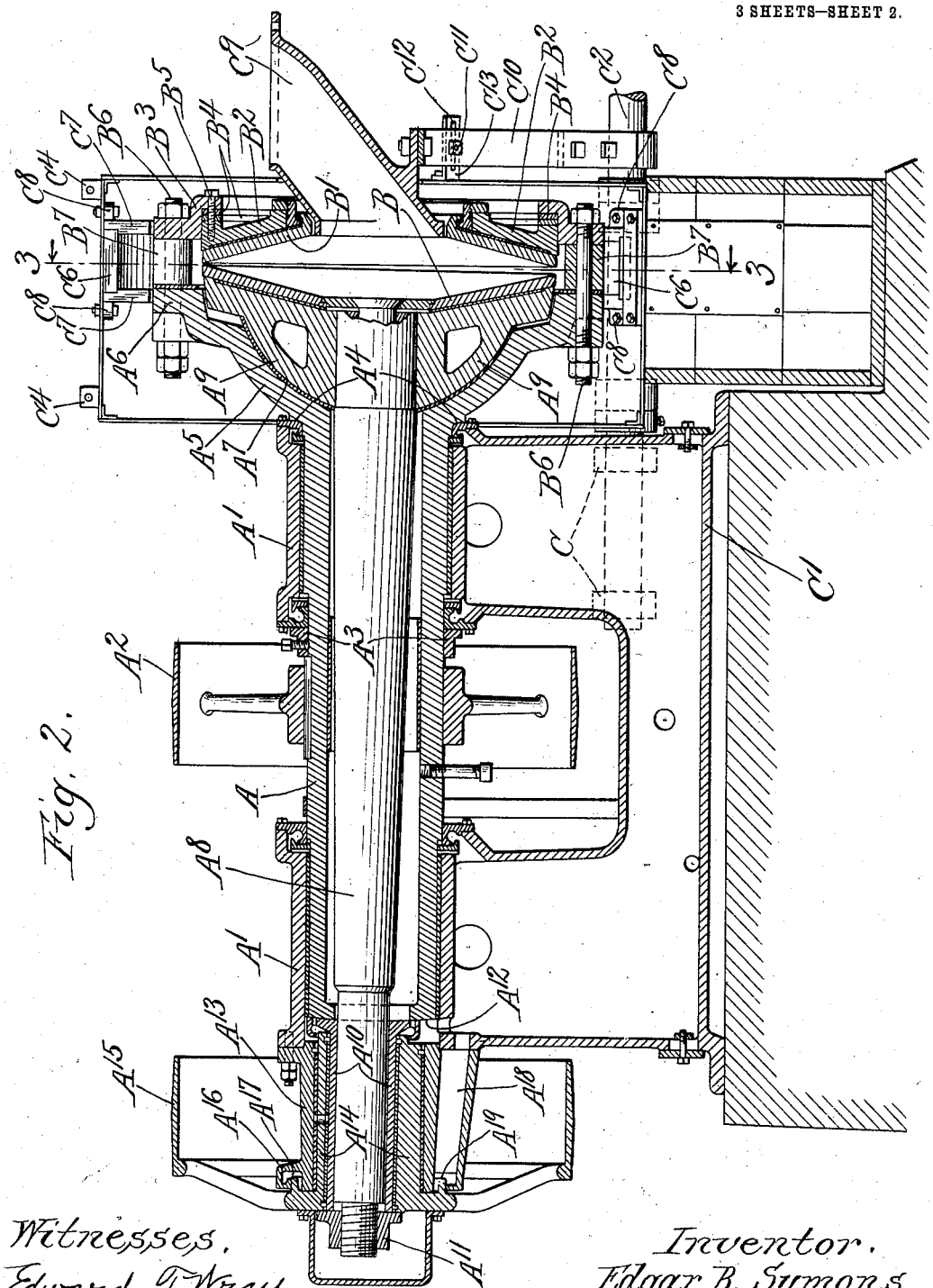
Figure 3:
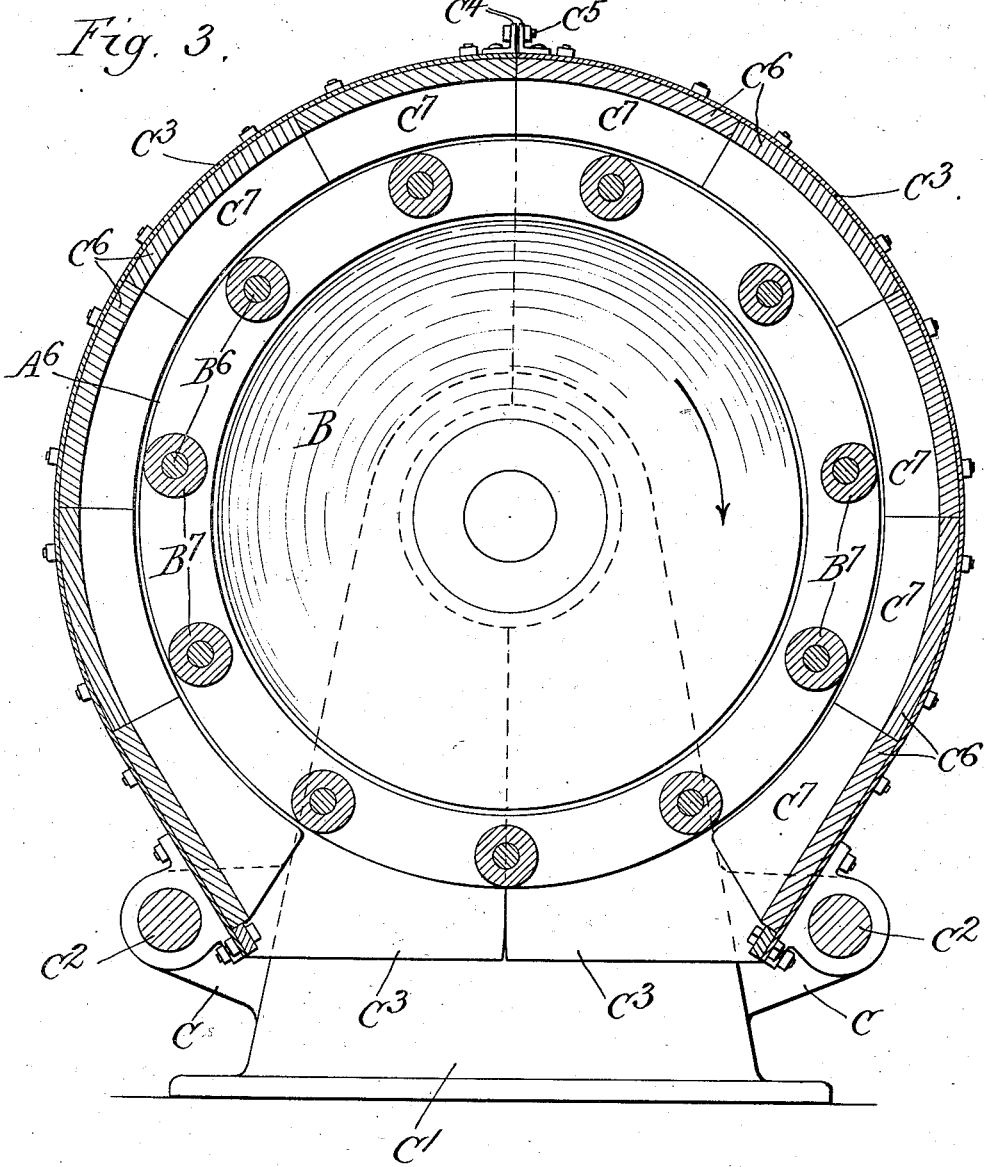

Figure 1 is an end view with the parts removed; Fig. 2, a section along the line 2—2 of Fig. 1; Fig. 3, a section along the line 3—3 of Fig. 2.

Like parts are indicated by like letters throughout the several figures.

The hollow shaft A which is rotatably mounted in the bearings $A^1$ driven by the pulley $A^2$ and held against longitudinal motion therein by the collar $A^3$ and shoulder $A^4$, terminates at one end in the bowl shaped member $A^5$ having the flange $A^6$ thereabout and containing the spherical anti-friction lining $A^7$. The shaft $A^8$ is located within the shaft A but extends beyond the end thereof and carries at one end the spherical head $A^9$ in opposition to the lining $A^7$ and has at the other end a sleeve $A^{10}$ held by the nut $A^{11}$ against a spherical surface $A^{12}$ at the end of the shaft A, drawn about the same center as the spherical lining $A^7$. The outer bearing $A^1$ carries the outwardly extending fixed bearing sleeve $A^{13}$ within which rotates the eccentric sleeve $A^{14}$ driven by the pulley $A^{15}$ and rotating about the sleeve $A^{10}$. The sleeve $A^{13}$ is provided at its outer end with the flange $A^{16}$ in which is the L shaped oil passage $A^{17}$ discharging into the conduit $A^{18}$ and inclosing the flange $A^{19}$ on the hub of the pulley $A^{15}$ to discharge oil into the base of the machine. The head $A^9$ carries the disk shaped crushing member B in opposition to a disk shaped crushing member $B^1$ mounted upon the carrying plate $B^2$ which is slidably mounted within the annular ring $B^3$ being held therein against the removable shims $B^4$ by the cap screws $B^5$. The annular ring $B^3$ is supported upon the flange $A^6$ by the bolts $B^6$ surrounded by the removable sleeves $B^7$. The lugs C project outwardly on either side from the base $C^1$ and carry the parallel horizontally disposed rods $C^2$ upon each of which is hinged one section of the hood or casing $C^3$, which are each provided at the top with the opposed lugs $C^4$ engaged by the bolt $C^5$ to hold them together. The hood sections $C^3$ carry upon their inner sides the curved wearing shields $C^6$ placed end to end about the periphery of the crushing plates and held in position by the side members $C^7$ which are recessed upon their inner sides to engage the shield $C^6$ and provided on their outer side with the spaced lugs $C^8$ bolted to the wall of the hood $C^3$. The chute $C^9$ is mounted upon the frame $C^{10}$ which is slidably mounted upon the rods $C^2$ and provided with the bolts $C^{11}$ to engage the slots $C^{12}$ in the lugs $C^{13}$ projecting from the side wall of the hood $C^3$.

It will be evident that while I have shown in my drawings an operative device, still many changes might be made in size, shape and arrangement of parts without departing materially from the spirit of my invention, and I wish therefore, that my drawings be regarded in a sense diagrammatic.

The use and operation of my device are as follows: In the form of disk crusher in which are two shafts at an angle one with the other carrying crushing disks at an angle one with the other and rotating in unison, it will be evident that there will be as many crushing strokes per minute as the shafts make revolutions per minute, and in order to increase the capacity of the machine the number of crushing strokes per minute must be increased. A point is soon reached at which the rotation of the shaft is so rapid that the bearings are heated up and that the surfaces against which the crushed material is centrifugally discharged are worn away with undue rapidity by the violent contact of the crushed material against them. In order to obviate this difficulty I provide means whereby the number of crushing strokes per minute may be increased independent of the rotational speed of the crushing disks. This is done by continuing the inner solid shaft out beyond the end of the outer shaft and mounting it in an eccentric sleeve which rotates in fixed bearings about an axis parallel with the axis of rotation of the main bearings of the machine. As this sleeve rotates it gives to the inner shaft a gyratory motion causing the crushing disks to approach toward and recede from one another as they rotate. It will be evident that this result will be obtained independent of the direction of the rotation of the eccentric sleeve. I prefer however, to rotate it in the opposite direction since I find that the number of crushing strokes is thereby increased. I also provide means for compensating for the wear caused by the rapidly moving crushed particles as they are centrifugally discharged. The holding bolts which take the crushing strain and connect the members holding the two crushing disks are inclosed in collars or sleeves which may be conveniently removed. In Fig. 3 I have shown some of these sleeves which have been partially worn down and which have been rotated, turning a new face toward the crushing disks. It will thus be evident that they may be worn about their entire periphery before they need be renewed. I provide also a hood or casing which is rotatably mounted and may be swung down away from the crushing head when it is desired to inspect or adjust it. I mount upon this hood or casing a plurality of curved wearing shields against which the crushed material discharges and which may be removed when worn out and replaced by new members. I provide means for adjusting the distance between the crushing disks comprising shims between the holding ring and the supporting back, which shims may be removed or other shims added as the case may be. The position of the feeding chute may be adjusted to correspond with the position of the crushing disk by sliding it upon the bars which project from the face of the machine and locking it in position by bolting the frame which carries it to lugs projecting from the hood or casing.

I reserve so much of the subject matter of this application as relates to the hood and its associated parts for a divisional application.

The apparatus here shown is not of course indispensable for all sizes of machines or for all kinds of work but in many cases the acceleration of the stroke here provided for is highly desirable.

The eccentric sleeve rotates within a fixed bearing, therefore the friction on the outside of the eccentric sleeve is only that friction which results from the rotation of the sleeve itself. The inner shaft rotates within the eccentric sleeve and in the opposite direction and here there will be a much greater friction resistance because the difference between the velocities of the rubbing surfaces will be much greater than the difference between the velocities of the rubbing surfaces on the outside of the sleeve. The fixed bearing in which the sleeve rotates may be easily got at for the purpose of cooling and lubricating these bearing surfaces, which would not be the case were the sleeve placed inside of the outer shaft. The two shafts rotate in the same direction being driven by the pulley $A^2$ the inner shaft being carried with the outer by reason of the frictional engagement of their two bearing surfaces and the material between their crushing disks. The bearings for the sleeve and for the inner shaft are carried on one and the same frame.

I claim:

1. In a crushing machine the combination with two opposed rotating crushing disks of inner and outer shafts by which said disks are carried, the inner shaft projecting beyond the outer at one end, an eccentric bearing for said inner shaft on the same removed from the outer shaft and means for rotating said eccentric bearing independently of said shafts.

2. In a crushing machine the combination with two opposed rotating crushing disks of inner and outer shafts by which said disks are carried, an eccentric bearing for said inner shaft comprising a rotatable sleeve on the inner shaft and means for rotating it and a fixed bearing in which such eccentric sleeve rotates.

3. In a crushing machine the combination with two opposed rotating crushing disks of inner and outer shafts by which said disks are carried, an eccentric sleeve for the said inner shaft, a bearing held against rotation within which such sleeve is received and means for rotating said sleeve within its bearing.

4. In a crushing machine the combination with two opposed rotating crushing disks of inner and outer shafts by which said disks are carried, the inner shaft projecting beyond the outer at one end, an eccentric bearing for said inner shaft on the same removed from the outer shaft comprising a fixed bearing and an eccentric sleeve between such bearing and the projecting end of the inner shaft and means for rotating said sleeve.

5. A crushing machine comprising a plurality of shafts, one within the other and rotating in the same direction with a bearing located beyond the end of the outer shaft and an eccentric sleeve within said bearing and upon the inner shaft and means for rotating the sleeve in a sense opposed to the rotation of the shafts.

6. A crushing machine comprising a plurality of shafts one within the other a fixed main bearing for the outer shaft, a collar upon the inner shaft in opposition to one end of the outer shaft, an eccentric sleeve rotating about said collar, a fixed bearing for said sleeve and means for rotating the eccentric sleeve.

7. A crushing machine comprising a plurality of shafts one within the other, a fixed main bearing for the outer shaft, a collar upon the inner shaft in opposition to one end of the outer shaft, an eccentric sleeve rotating about said collar, a fixed bearing for said sleeve and means for rotating the eccentric sleeve, the opposed ends of the collar and outer shaft being spherical.

8. A crushing machine comprising a frame, an outer cylindrical shaft mounted therein, an inner shaft, the two connected at their respective ends by concentric spherical surfaces, two opposed crushing disks carried one by each of said shafts, means for rotating them together in the same direction, the inner shaft projecting at one end beyond the outer shaft, fixed bearings mounted on the frame for the inner and the outer shafts and an eccentric sleeve between the inner shaft and its bearing and means for rotating the same in a sense opposed to the rotation of the shaft.

EDGAR B. SYMONS.

Witnesses:
F. A. OTTO,
EDITH RAASCH.